United States Patent [19]

Clark

[11] 4,067,054
[45] Jan. 3, 1978

[54] OVER-VOLTAGE PROTECTION

[75] Inventor: William Randolph Clark, Bedford, MA

[73] Assignee: I-T-E Imperial Corporation, Spring House, Pa.

[21] Appl. No.: 681,691

[22] Filed: Apr. 29, 1976

[51] Int. Cl.² .............................................. H02H 3/20
[52] U.S. Cl. ...................................... 361/91; 361/55; 361/77
[58] Field of Search .................... 317/48, 47, 52, 31, 317/27 R, 18 B; 340/248 C, 248 A; 361/91, 77, 55, 86, 88, 118, 119

[56] References Cited

U.S. PATENT DOCUMENTS

| | | | |
|---|---|---|---|
| 3,243,658 | 3/1966 | Blackburn | 317/31 |
| 3,766,434 | 10/1973 | Sherman | 317/18 B X |
| 3,944,891 | 3/1976 | McDonald | 317/48 |
| 3,946,282 | 3/1976 | Weiss et al. | 317/48 |
| 3,987,341 | 10/1976 | Clark | 317/48 X |

Primary Examiner—J D Miller
Assistant Examiner—Patrick R. Salce

Attorney, Agent, or Firm—Ostrolenk, Faber, Gerb & Soffen

[57] ABSTRACT

An over-voltage protection apparatus includes an over-voltage detector measuring the voltage between each energized conductor and a neutral or ground line associated therewith series connected between an A.C. power source and a utilization device and an over-current protection device, such as a circuit breaker, to disconnect the conductors from the energy source in the event the voltage on any one of the energized lines exceeds a predetermined threshold voltage. Suitable over-voltage detectors consist of any device which is non-conductive for all input voltages less than a threshold voltage and are conductive after the input voltage has exceeded the threshold voltage.

The over-voltage protection apparatus described is applied to A.C. power circuits having at least one phase and at least two wires. Use of the apparatus to also provide protection in the event of an open neutral line condition, when unequal loads are present between at least two energized conductors and the neutral line is also described.

9 Claims, 4 Drawing Figures

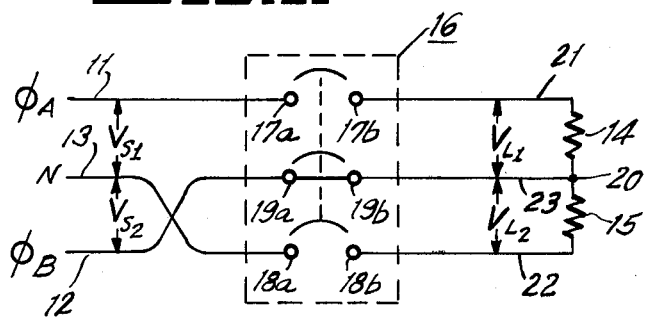
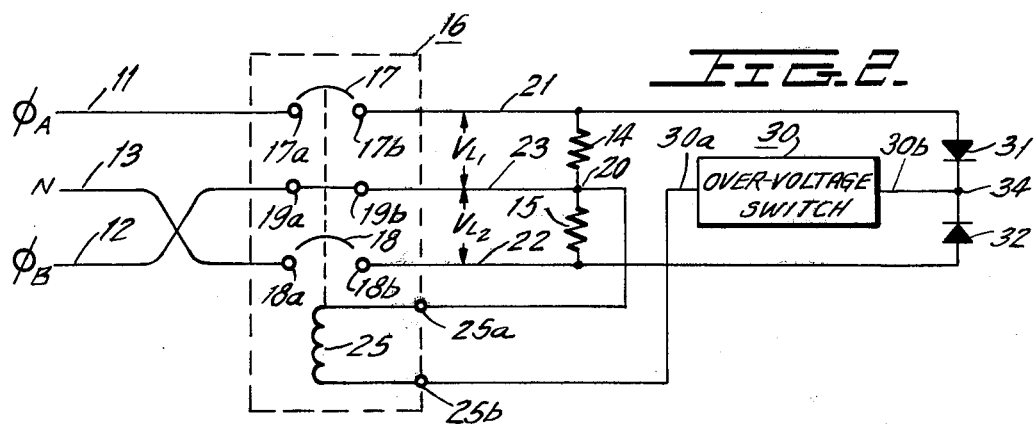
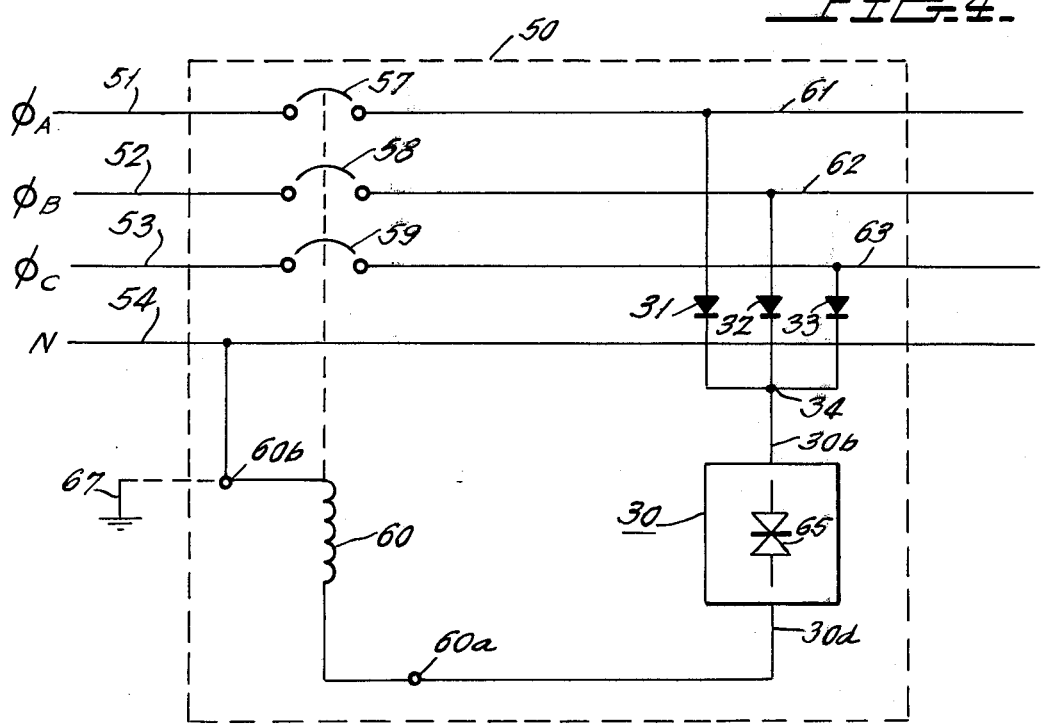

OVER-VOLTAGE PROTECTION

BACKGROUND OF THE INVENTION

It is well-known in the power distribution art that a panel board will occasionally be inadvertently mis-wired whereby one energized line is connected to the neutral line connection while the neutral line is connected to one of the energized line connections. In such instance, the application of power will cause a voltage in excess of the normal line-to-neutral voltage to be applied to one load device, which will generally be damaged by the applied over-voltage. The other load, or loads, may become hazardous due to the phase reversal applied thereto. Normal over-current protection devices, such as fuses, circuit breakers and the like, will not protect each load device from these over-voltage effects as the current flowing therethrough will generally not be excessive until after the load device has been damaged.

BRIEF SUMMARY OF THE INVENTION

It is desired to provide over-voltage protection apparatus to disconnect all energized lines between an A.C. energy source and a utilization device in the event the voltage beteen any energized line and the neutral or ground line exceeds a predetermined voltage.

In accordance with the invention, an over-voltage protection apparatus for achieving the above-described goal, includes circuit interruption means having one pole series connected in each energized line between the A.C. energy source and the utilization device; normally non-conducting over-voltage switch means coupled to each energized line for energizing an output thereof responsive to a voltage on any energized line in excess of a predetermined value, and trip means coupled to said over-voltage switch means to said interruption means for substantially simultaneously disconnecting each energized line from said A.C. energy source responsive to the energization of said over-voltage switch means.

The over-voltage switch means may be a spark gap device having a gap width predeterminately selected to fire the spark gap responsive to a normal voltage peak applied thereto exceeding the predetermined gap firing voltage value, or may be a two terminal electronic device, such as a diac, avalanche diode and the like, which device is normally nonconductive until the voltage across the pair of terminals exceeds a predetermined firing voltage, at which voltage the device switches to a conductive mode.

The apparatus of the present invention also provides protection against an open neutral line condition between the A.C. energy source and the over-voltage switch means if unequal loads are connected between each of a plurality of energized lines and the neutral line.

There has just been described apparatus for protecting a load device, connected by a multi-wire circuit to an energy source, from an over-voltage condition present on any of the energized lines, as referenced to the neutral line.

Accordingly, it is one objective of the present invention to provide means for protecting a utilization device from an over-voltage condition.

It is another object to provide such protection for a utilization device powered by an A.C. energy source.

It is a further object to provide such over-voltage protection using standard circuit interruption means and cost effective over-voltage detection means.

These and other objects of the present invention will become apparent to one skilled in the art, when reading the following detailed description of the drawings.

DESCRIPTION OF THE DRAWINGS

FIG. 1 is a schematic diagram illustrating the mis-wiring of the connections to a circuit interruption device, and useful in understanding the principle of the present invention;

FIG. 2 is a mis-wired circuit breaker and an over-voltage protection apparatus in accordance with the principle of the present invention;

FIG. 3 is a graph illustrating a voltage-current curve for an over-voltage switch used in the invention; and FIG. 4 is another embodiment of an over-voltage protection apparatus in accordance with the principle of the invention and of a multi-phase power line with which it is used.

DETAILED DESCRIPTION OF THE INVENTION

Referring initially to FIG. 1, a representative circuit includes a single-phase, three-wire energy source (not shown) coupled to phase A first conductor 11, phase B second conductor 12 and neutral line 13. It should be understood that this well-known single-phase, three-wire circuit is illustrative of the problem to be discussed and that any power distribution circuit having at least two conductors and at least a single phase may be similarly described.

The power source energizes phase A first conductor 11 to a known voltage with respect to neutral line 13, such as the commonly used 120 VAC line-to-neutral voltage; similarly, phase B second conductor 12 is energized to a voltage, with respect to neutral 13, having the same magnitude but having a waveform 180° out of phase with the waveform on phase A first conductor 11. Proper safety conditions require that energized conductors 11, 12 be connected to the hot terminal of respective first and second loads 14, 15 whose other terminal is connected to neutral line 13. Protection against over-current hazards is normally provided by a circuit protection device 16 such as a circuit breaker or the like, which in the illustrative example, include two sets 17 and 18 of separable contacts. First contact set 17a, 17b is to be electrically series connected in one energized conductor 11 while the other contact set 18a, 18b is to be electrically series connected in the remaining energized conductor 12. The neutral line is designed to be brought through circuit protection device 16 in an integral manner, as shown by the non-separable connection between neutral line terminals 19a and 19b, for connection to the common junction 20 between loads 14 and 15.

A most common mistake in a panel-board wiring operation is to connect one energized conductor, such as phase B conductor 12, to the neutral terminal 19a of circuit protection device 16 while inadvertently connecting neutral line 13 to one terminal 18a of a separable contact set intended for connection to an energized conductor. This mis-wiring results in a first load voltage $V_{L1}$, between first load conductor 21 and load neutral conductor 23, equal to the vector sum of both source voltages $VS_1$ and $VS_2$, in the case of the example being equal to 240 volts AC. This over-voltage is in excess of the rated voltage of first load 14, causing damage thereto. The second load voltage $V_{L2}$, between second load conductor 22 and load neutral 23, remains equal to second source voltage $V_{s2}$ and will not damage second load 15 connected thereacross.

Referring now to FIG. 2, where like reference designations refer to like elements, first load 14 has a twice-line-voltage condition thereacross due to the reversed connection of phase B conductor 12 and neutral line 13 to terminals 18a and 19a of circuit protection device 16. Trip means 25 is now coupled to both contact sets 17 and 18 to substantially simultaneously break the circuit between first conductor terminals 17a and 17b and second conductor terminals 18a and 18b responsive to a flow of current through shunt means 25 from a first shunt means terminal 25a to a second shunt means terminal 25b. Over-voltage switch means 30 senses the peak magnitude of the voltage between each energized load conductor 21, 22 and load neutral line 23. A common terminal 30a of over-voltage switch 30 is connected to terminal 25b of trip means 25. Terminal 25a of trip means 25 is connected to load neutral line 23. Over-voltage switch input 30b is coupled to the energized load conductors to be monitored. In a preferred embodiment each energized load conductor i.e. phase A first conductor 21 and phase B second conductor 22 in the single-phase, three-wire circuit of FIG. 2, is connected respectively to an anode of respective first and second unidirectional conduction elements 31, 32, whose cathodes are connected together to form a common junction 34 for connection to over-voltage switch input 30b.

Over-voltage switch 30 may be any device having a general characteristic as shown in FIG. 3, wherein input voltage (V), being that voltage between input 30b with respect to common line 30a, is plotted along abscissa 40 and output current (I), being the available current flowing through the device, is plotted along ordinate 41. Over-voltage switch 30 preferably permits no current to flow for any applied voltage V less than a predetermined firing voltage $V_f$ in which first condition over-voltage switch 30 appears as a non-conductive or open circuit, whereby no current flows through shunt trip means 25. Thus, no output current I flows for any peak line voltage V between points 42, equivalent to predetermined firing voltage $V_f$ and over-voltage switch 30 becomes conductive to allow an output current I as indicated by the line segments 43, to flow when the voltage across switch 30 exceeds the firing voltage 42. The magnitude of output current I is predominately established by the impedance of shunt trip means 25 at the line frequency of the A.C. energy source. This flow of current from load neutral conductor 23 through shunt trip means 25, over-voltage switch 30, and diode 31 to load conductor 21 energizes shunt trip means 25 to substantially simultaneously separate contacts sets 17 and 18, thereby interrupting the flow of current on energized load conductors 21 and 22 to prevent over-voltage damage to loads 14 and 15. This over-voltage protection is achieved during the first cycle of voltage across the loads, as over-voltage switch 30 conducts, if at all, at the positive voltage peak, for the indicated connection polarity of coupling diodes 31 and 32 as shown in FIG. 2.

Over-voltage switch 30 may be any electrical device having a fundamental characteristic of being non-conductive at voltages below a threshold voltage and switching to a conductive mode at voltages above the threshold voltage, and having a small voltage thereacross in the conductive mode. One of the simplest and most cost-effective devices for this purpose is a spark-gap, which appears as an open circuit until the voltage across the gap exceeds the gap-firing voltage, at which voltage an arc is generated across the gap and the gap voltage is sharply reduced while current flows through any load in electrical series connection between the gap and a common line, connected to the opposite terminal of the energy source being monitored by the spark-gap device. A two terminal electronic device, such as a diac or avalanche diode, may be used in place of the spark gap. Thus, it should be understood that any electrical device having the aforementioned non-conductive condition at a voltage below the threshold voltage and a conductive condition at voltages above the threshold voltage whereby a low voltage is maintained across the device, can be used. It should also be further understood that such a device is usable to obtain the desired over-voltage protection, as long as the current flowing through the device to shunt trip means 25 is reliably less than the actuating current flow 44 required by shunt trip means 25 for all voltages across switch means 30 less than the threshold voltage $V_f$, and the device is capable of permitting a current flow I of magnitude determined by the impedance of shunt trip means 25, in the event the applied voltage exceeds threshold voltage $V_f$, with the over-voltage only then being applied to shunt trip means 25, to prevent shunt trip means 25 from being "teased" by voltages near its threshold.

Referring now to FIG. 4, an embodiment of an over-voltage protection arrangement 50 for a multiphase circuit, consisting of a phase A first conductor 51, phase B second conductor 52, phase C third conductor 53 and neutral line 54, connected between a three-phase four-wire A.C. energy source (not shown) and a load device (not shown), includes first, second, and third sets of cooperating contacts, 57, 58 and 59, respectively, and shunt trip means 60 coupled thereto for substantially simultaneously separating all three sets of contacts responsive to a flow of current of a predetermined magnitude therethrough. Each energized load conductor 61, 62, 63, respectively, is connected to the anode of an associated coupling diode 31, 32, 33, respectively; the cathodes of the coupling diodes are connected together at common junction 34 connected to input 30b of over-voltage switch 30. Over-voltage switch 30 is illustrated in this embodiment as including a diac 65, having a firing voltage $V_f$ predeterminately selected to exceed the highest normal peak voltage between each energized conductor, 51, 52 or 53, and the neutral line 54, yet be less than 1.5 times the normal peak line-to-neutral voltage for proper sensing of a transposed neutral-phase wiring, and series connected between over-voltage switch input 30b and output 30d and thence to one terminal 60a of shunt trip means 60 whose other terminal 60b is connected to either neutral line 54, or, in a preferred embodiment, to earth ground 67, for a purpose to be hereinafter described in further detail.

The connection of shunt trip means terminal 60b to neutral line 54 or earth ground 67 provides an essentially zero voltage reference at over-voltage switch means output 30b; the most positive of load conductors 61, 62 or 63 will forward bias its associated coupling diode 31, 32 or 33, respectively, into conduction to apply that load conductor voltage to junction 34 and to over-voltage switch input 30b. Thus, the peak positive magnitude of the voltage between each load conductor and neutral or earth ground will consecutively appear across normally non-conductive over-voltage sensing diac 65, causing conduction thereof only in the event the peak voltage magnitude exceeds the diac threshold voltage $V_f$. A low voltage appears across diac 65 after it has switched to its conductive condition, whereby substantially all of the peak phase voltage now appears between first and second shunt trip means terminals, 60a and 60b, respectively, to cause a flow of current through shunt trip means 60 to substantially simultaneously separate contact pairs 57, 58 and 59 and interrupt the flow of current therethrough to load conductors 61, 62 and 63 and the load device. Contact pairs 57, 58 and 59 remain in the open condition and must be manually reset to their closed condition, at which event over-voltage switch 30 will again energize shunt trip means 60 to interrupt the current flow within the time interval required for one line frequency cycle, to re-interrupt the flow of current to the load device if the over-voltage condition is still present; the interruption-upon-resetting-contacts operation will continue without allowing the load device to dissipate power for any appreciable length of time, until the device operator corrects the underlying wiring or device fault causing the over-voltage condition. Shunt trip means 60, having no initial current flowing therethrough, applies no resulting IR drop to over-voltage switch output 30d and does not affect the firing voltage $V_f$ of over-voltage switch 30. Conversely, a non-conductive over-voltage switch 30 applies essentailly zero voltage to trip means 60, whereby shunt trip means 60 is not teased toward its actuating current.

The over-voltage protection technique of the present invention also provides protection against an open neutral line condition when unequal loads are connected between each of two or more energized conductors and the neutral line. As best shown in FIG. 2, in the continuous neutral line condition first load-voltage $V_{L1}$ equals second load voltage $V_{L2}$ as the voltage from phase A load conductor 21 to load neutral line 23 equals the magnitude of voltage from phase B load conductor 22 to load neutral line 23. If load neutral line 23 is open at any point between the A.C. energy source and load common junction 20, the voltages appearing across each load 14 and 15 will depend upon the power rating, and hence the resistance, of the respective load. Illustratively, for the common single-phase, three-wire configuration, where phase A and phase B conductor voltages each equal 120 volts A.C. with respect to neutral, and where phase A and phase B are 180° out of phase each from the other, then if first load 14 is 200 ohms and second load 15 is 100 ohms, the resulting voltages are $V_{L1} = 160$ VAC, and $V_{L2} = 80$ VAC. With the common cathode connection of coupling diodes 31 and 32 as illustrated, over-voltage switch 30 has applied between its input and common terminals 30b, 30a, respectively, the higher of the two load voltages, here being the voltage across first load 14, or V = 160 volts. For over-voltage switch 30 having a firing voltage slightly in excess of 120 VAC to insure lack of firing at normal 120 volt AC peaks yet firing for, preferably, 10 percent over-normal-voltage, voltage switch 30 will trigger at approximately 132 volts; the application of 160 volts across the first load 14 will trigger over-voltage switch 32 to cause a flow of current through shunt trip means 25 and essentially simultaneously separate contact sets 17 and 18, thereby interrupting the flow of current in load conductors 21 and 22 in the event load neutral line 23 appears as an open circuit. It should be understood that the same operation is achieved for the three-phase circuit illustrated in FIG. 4, or, indeed, for any power carrying circuit having at least two energized conductors, each conductor having a current flowing therein which is not substantially in-phase with the current flowing in each other energized conductor.

There has just been described a novel over-voltage protection arrangement for interrupting the flow of current in a plurality of energized conductors from an energy source to a load device in the event the voltage on any one of the energized conductors exceeds a predetermined threshold voltage, and providing protection in the event of an open neutral line condition between the energy source and the common junction between the load devices, when unequal loads are connected between each energized conductor and the neutral line.

The present invention has been described in connection with several preferred embodiments thereof; many variations and modifications will become apparent to those skilled in the art. It is preferred, therefore, that the present invention be limited not by the specific disclosure herein, but only by the appended claims.

What is claimed is:

1. Circuit protection apparatus for disconnecting a power distribution circuit having a plurality of energized lines and a neutral line coupled between an A.C. energy source and a utilization device, said apparatus comprising:

circuit interruption means having a pole in electrical series connection with each said energized line;

trip means coupled to said circuit interruption means for substantially simultaneously disconnecting all said energized lines from said utilization device responsive to an energization of said trip means; and an over-voltage sensor of the Avalanche type coupled to each said energized line and adapted to couple a substantially zero amount of energy to said trip means when the voltages on all said energized lines are less than a predetermined value and to energize said trip means responsive to a voltage on at least one energized line in excess of said predetermined value, said over-voltage sensor and said trip means being connected to said power distribution circuit in such a manner that said sensor will energize said trip means even when said neutral line is open.

2. Circuit protection apparatus as set forth in claim 1, wherein said over-voltage sensor has an input and an output; said sensor output being coupled to said trip means; and unidirectional conduction means coupled to each said energized line for coupling only that energized line having the greatest instantaneous voltage thereon to said sensor input.

3. Circuit protection apparatus as set forth in claim 2, wherein said unidirectional conduction means comprises a plurality of semiconductor diodes, each diode having an anode and a cathode, each said diode anode coupled to a different one of said energized lines, all said diode cathodes coupled together to form a common junction therebetween, said common junction being coupled to said over-voltage sensor input.

4. Circuit protection apparatus as set forth in claim 3, wherein said ove-voltate sensor includes a normally non-conductive device coupled between said sensor input and said sensor output, said device adapted to couple a conductive path between said sensor input and said sensor output responsive to a voltage at said sensor input in excess of said predetermined voltage value.

5. Circuit protection apparatus as set forth in claim 4, wherein said trip means is coupled between said sensor output and said neutral line.

6. Circuit protection apparatus as set forth in claim 1, wherein said utilization device includes a plurality of loads, each said load being coupled between a common junction and a different said energized line and wherein said over-voltage sensor and said trip means are coupled in series between said energized lines and said common junction.

7. Circuit protection apparatus as set forth in claim 1, wherein said over-voltage sensor and said trip means are coupled in series between said energized lines and an earth ground.

8. Circuit protection apparatus for disconnecting a power distribution circuit having a plurality of energized lines and a neutral line coupled between an A.C. energy source and a utilization device, said apparatus comprising:

Circuit interruption means having a pole in electrical series connection with each said energized line;

trip means coupled to said circuit interrupting means for substantially simultaneously disconnecting all energized lines from said utilization device responsive to an energization of said trip means;

a spark gap device having an input and an output, said output being coupled to said trip means;

a plurality of semiconductor diodes, each said diode having an anode and a cathode, each of said diode anodes coupled to a different one of said energized lines, each of said diode cathodes coupled together to form a common junction therebetween, said common junction being coupled to said spark gap device input;

said spark gap device having a gap distance selected to cause said spark gap to fire responsive to a peak voltage at said spark gap device input in excess of a predetermined value such that said spark gap device couples a substantially zero amount of energy to said trip means when the voltages on all said energized lines are less than said predetermined value and said spark gap device energizes said trip means when the voltage on any one of said energized lines exceeds said predetermined value.

9. Circuit protection apparatus for disconnecting a power distribution circuit having a plurality of energized lines and a neutral line coupled between an A.C. energy source and a utilization device, said apparatus comprising:

circuit interruption means having a pole in electrical series connection with each said energized line;

trip means coupled to said circuit interruption means for substantially simultaneously disconnecting all said energized lines from said utilization device responsive to an energization of said trip means;

a diac having an input and an output, said diac output being coupled to said trip means;

a plurality of semiconductor diodes, each said diode having an anode and a cathode, each of said diode anodes coupled to a different one of said energized lines, each of said diode cathodes coupled together to form a common junction therebetween, said common junction being coupled to said diac input;

said diac having a threshold voltage selected to cause diac to conduct responsive to a peak voltage at said diac input in excess of a predetermined value such that said diac couples a substantially zero amount of energy to said trip means when the voltages on all said energized lines are less than said predetermined value and said diac completes a conductive path between said junction and said trip means so as to energize said trip means when the voltage on any one of said energized lines exceeds said predetermined value.

* * * * *